Jan. 11, 1927.  1,613,841

H. J. MONSON

LAMP FOR MOTOR VEHICLES

Filed Feb. 12, 1923  2 Sheets-Sheet 1

Inventor
H. J. Monson
By
Hull Brock & West
Attys

Jan. 11, 1927.  H. J. MONSON  1,613,841
LAMP FOR MOTOR VEHICLES
Filed Feb. 12, 1923    2 Sheets-Sheet 2
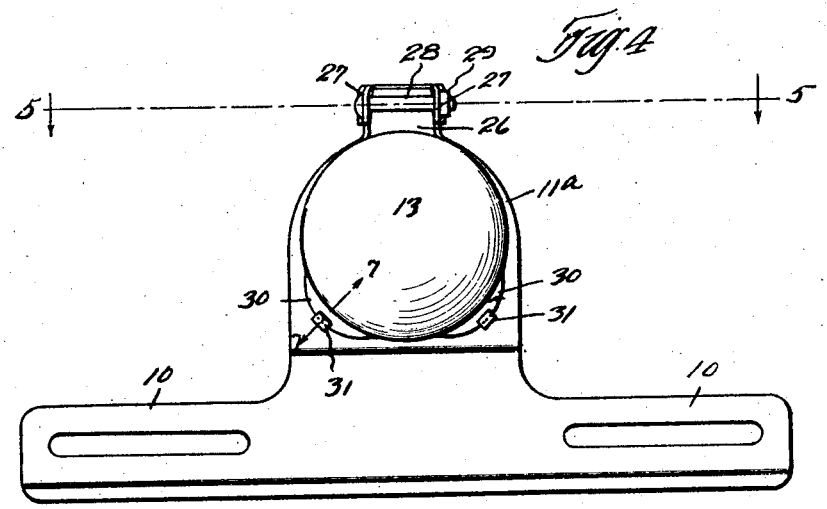
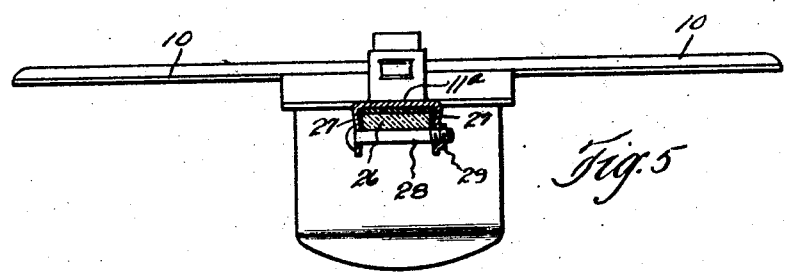
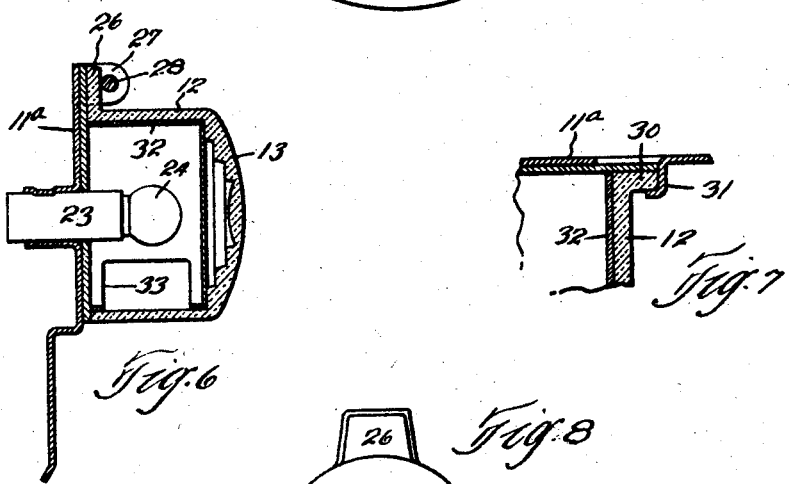
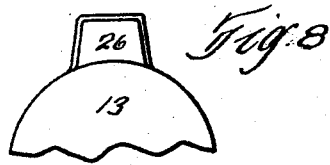

Patented Jan. 11, 1927.

1,613,841

UNITED STATES PATENT OFFICE.

HUGH J. MONSON, OF LAKEWOOD, OHIO, ASSIGNOR TO THE GUIDE MOTOR LAMP MANUFACTURING COMPANY, OF CLEVELAND, OHIO, A CORPORATION OF OHIO.

LAMP FOR MOTOR VEHICLES.

Application filed February 12, 1923. Serial No. 618,688.

This invention relates generally to tail lamps for motor vehicles, and more particularly to certain novelties in the make up of the lamp whereby simplicity of assembly and economy of manufacture are accomplished.

Another object of the invention is to provide a novel construction of tail lamp and also a simple and inexpensive method of connecting the same to the license plate or bracket.

With these various objects in view, and certain others which will appear, the invention consists in providing a cylindrical glass casing having a lenticular front and means for connecting said glass casing to the license plate or bracket.

The invention also resides in the novel construction of license plate or bracket whereby such connection can be had and the invention consists also in the novel forms of glass casings whereby the general features of the invention can be carried out.

The invention consists also in certain details of construction and in the manner of combining or arranging said parts, all of which will be more fully described hereinafter and pointed out in the appended claims.

Figure 1:
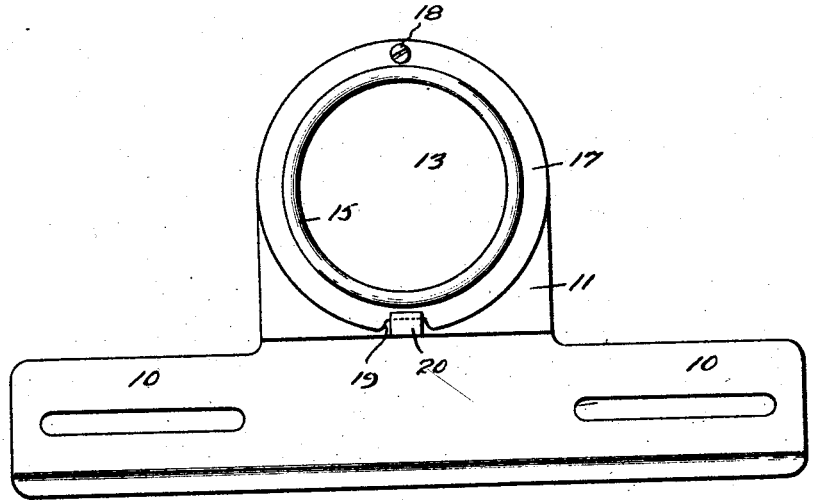
Figures 2, 3:
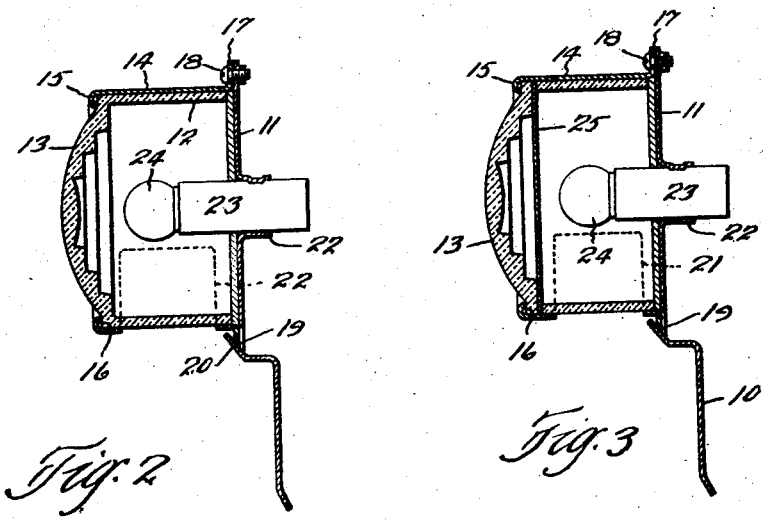

In the drawings forming a part of this specification Fig. 1 is a face view of a license plate or bracket with my improved tail lamp connected thereto; Fig. 2 is a vertical sectional view of the same; Fig. 3 is a similar view showing a slight modification; Fig. 4 is a face view of a different construction of lamp casing and bracket to which it is attached; Fig. 5 is a sectional plan view of the same on the line 5—5 of Fig. 4; Fig. 6 is a vertical sectional view and Figs. 7 and 8 show details of construction.

In carrying out my invention I employ a combined lamp and license plate or bracket made of sheet metal and comprising the laterally projecting portions 10 and the upwardly extending member or part 11, the lamp being attached to the upward extending member, and the license (not shown) to the portions 10.

Heretofore the lamp case has usually been made of sheet metal and provided with a red glass front and this lamp case has been bolted, riveted or welded to the bracket.

In the present instance, I propose to make the lamp case and lens all of glass, and connect this to the bracket which also serves to carry the lamp socket.

In Fig. 2 I have shown the cylindrical glass casing 12 and lens 13 as formed integral and it will be understood that the lens 13 is of red glass and the cylindrical part 12 of clear or uncolored glass, and then these two parts are united with molding or in any suitable manner.

The glass casing is surrounded by a thin metal shell 14 which has its forward edges rolled inwardly as shown at 15 to engage the shoulder 16 on the lens 13 and at its inner end this thin shell is formed with an outwardly projecting annular flange 17, and a screw 18 passing through this flange at the top connects it to the member 11; and at the bottom this flange is notched at 19 for engagement with an upwardly projecting tongue 20 punched from the member 11 at its lower end, and it will be noted that the member 11 is forwardly offset from the portion 10, but this is not absolutely necessary.

The lower half of the enveloping shell 14 has an opening 21 cut therein so that the light rays may pass through to the license attached to the plate portion 10.

The member 11 has a sleeve 22 formed thereon or attached thereto, and in which fits the usual socket 23 provided with the incandescent bulb 24.

Instead of making the lens and cylinder all one they can be made separate as shown in Fig. 3, the enveloping shell serving to hold the two parts together and also connect them to the bracket.

The lens can be red and the cylindrical part clear or both can be clear and a red screen 25 of glass or other suitable material may be interposed between the cylinder and lens, or the inner face of the lens may be coated with a red colored material which will not obstruct the rays of light, but which will impart a red color to the lens.

A lamp constructed as herein shown and described, is cheap; simple to make, and is easily attached to the bracket, and serves all the functions and purposes of the more expensively constructed and connected tail lamps. In Figs. 4, 5 and 6 I have shown a slightly modified form of the broad idea, and in this construction the cylindrical glass casing 12 and lens 13 are formed integral and the lens is red and the cylinder clear, and this cylinder has a lug 26 at its upper end which fits between the clamping ears 27 integral with the upper end of member 11ª and bound against the lug 26 by screw 28 and nut 29, and the cylindrical casing is also provided with laterally projecting lugs 30 which engage tongues 31 punched from the lower end of the member 11ª and in this manner, the casing is securely connected to the bracket.

The bracket member 11ª carries the lamp socket as previously described. Within the cylindrical casing I arrange a thin band 32 of any suitable material to prevent the escape of light except through the bottom opening 33.

The lens and cylinder in this structure must be integral and the lens can be of red glass and molded to the cylinder or otherwise permanently connected thereto; or one or both faces thereof may be coated with a red colored compound in case said lens is made of clear glass.

The lamp as a whole is exceedingly simple, easily fabricated and assembled and possesses all the merits of a more expensive and complicated device.

It will therefore be seen that I provide an exceedingly cheap and simple form of tail lamp which can be readily and securely connected to the license plate or bracket, and firmly held against movement. It is also obvious that the lamp can be quickly opened or removed when desired.

Having thus described my invention, what I claim is:

1. The combination with a plate having an offset and upwardly extending portion provided with a socket receiving sleeve, of a lamp casing having a screw connection at the upper end with the upper portion of the plate extension, the lower portion of the casing engaging a lug or lugs extending from the plate extension.

2. The combination with a plate having an offset upwardly extending portion provided with a socket receiving sleeve, of a glass lamp casing and a sheet metal shell surrounding the same, said shell having an opening in the lower side thereof, the rear end of said shell being flanged, a screw connecting the flange and plate extension at the upper end, and a tongue engaging the flange at the lower side.

In testimony whereof, I hereunto affix my signature.

HUGH J. MONSON.